United States Patent [19]
Leiponen et al.

[11] 3,938,672
[45] Feb. 17, 1976

[54] DEVICE FOR TRANSFERRING A PLATE-LIKE PRODUCT FROM ONE STATION TO ANOTHER

[75] Inventors: Matti Olavi Leiponen, Harjavalta; Tuomo Veikko Juhani Kivisto, Helsinki, both of Finland

[73] Assignee: Outokumpu OY, Outokumpu, Finland

[22] Filed: Sept. 18, 1974

[21] Appl. No.: 506,990

[30] Foreign Application Priority Data
Sept. 21, 1973 Finland .............................. 2959/73

[52] U.S. Cl. ............................................. 214/1 BD
[51] Int. Cl.² ........................................... B66C 1/54
[58] Field of Search ........... 214/1 BD, 1 BV, 147 R, 214/147 T, 147 G, 1 Q

[56] References Cited
UNITED STATES PATENTS

| | | | |
|---|---|---|---|
| 2,579,094 | 12/1951 | Rooksby | 214/147 TC X |
| 3,314,554 | 4/1967 | Cuniberti | 214/1 Q |
| 3,610,449 | 1/1970 | Hashimoto | 214/147 T X |
| 3,850,319 | 11/1974 | DiFrank et al | 214/1 Q X |

Primary Examiner—Frank E. Werner
Attorney, Agent, or Firm—Brooks Haidt Haffner & Delahunty

[57] ABSTRACT

A device for transferring a plate-like product from one station to another, especially an anode plate from a casting table into a cooling tank, said device having a base supporting a frame pivotally about an essentially horizontal axis, gripping members on said frame for grasping and releasing the plate, and power means associated with the frame for turning it about said axis from a first end position, wherein the gripping members can catch a plate at the first station, to a second end position, wherein the gripping members release the plate at the second station. Preferably, the base comprises two vertical pillars positioned between said stations, and the frame, being pivotally mounted between said pillars, is a metal frame larger than the plate so that during the turning movement the plate, hanging in the gripping members, can move through the frame.

2 Claims, 2 Drawing Figures

DEVICE FOR TRANSFERRING A PLATE-LIKE PRODUCT FROM ONE STATION TO ANOTHER

BACKGROUND OF THE INVENTION

1. Field of the Invention

The present invention relates to a device for transferring plate-like products from one station to another. Especially, the invention relates to the transferring of anode plates from a casting table to a cooling tank or basin positioned near said casting table.

2. Description of the Prior Art

From, for example, U.S. Pat. No. 3,715,048, it is known to use, for transferring anode plates, a carriage which moves along rails and which has been provided with grippers which grip the lugs of the anode plates. The carriage is driven by, for example, an electric motor. It is, however, obvious that such a linearly moving device with vertically movable gripping members is both expensive and space-consuming. Furthermore, its speed is not as good as it could be. It is also evident from U.S. Pat. No. 3,338,437 that automatic control of a mechanism of the said type is relatively complicated. Other modified mechanisms are also known, such as the use of chains or other conveyors.

The said known devices have, however, a relatively complicated and space-consuming construction in common, and the object of the present invention is to provide a device which eliminates these disadvantages.

SUMMARY OF THE INVENTION

This invention provides a transferring device which comprises a base, a lifting frame pivoted to swing about an essentially horizontal shaft supported by the base, gripping members provided onto said frame and being movable to engage and release the plate-like product, and a power mechanism connected to said frame for turning the frame between two positions so that in one position of the frame the gripping members can grip the plate at said one station and in another position of the frame the gripping members can place the plate at said another station.

Thus, according to the invention the lifting and the transferring of the plates takes place by means of a simple turning movement, which guarantees an unfailing performance, excellent speed, and excellent precision for the device.

The transfer mechanism according to the invention has thus been designated mainly for lifting anode plates from the casting table after the casting and for transferring them immediately into an adjacent cooling tank. It is clear, however, that such a mechanism can also be used for transferring other similar plates between two points relatively close to each other.

DESCRIPTION OF THE PREFERRED EMBODIMENTS

In the embodiments according to the figures, the base of the device consists of two pillars 1 and 2, which have been fitted between the anode plate (A) casting table 12 and the cooling tank.

Figure 2:
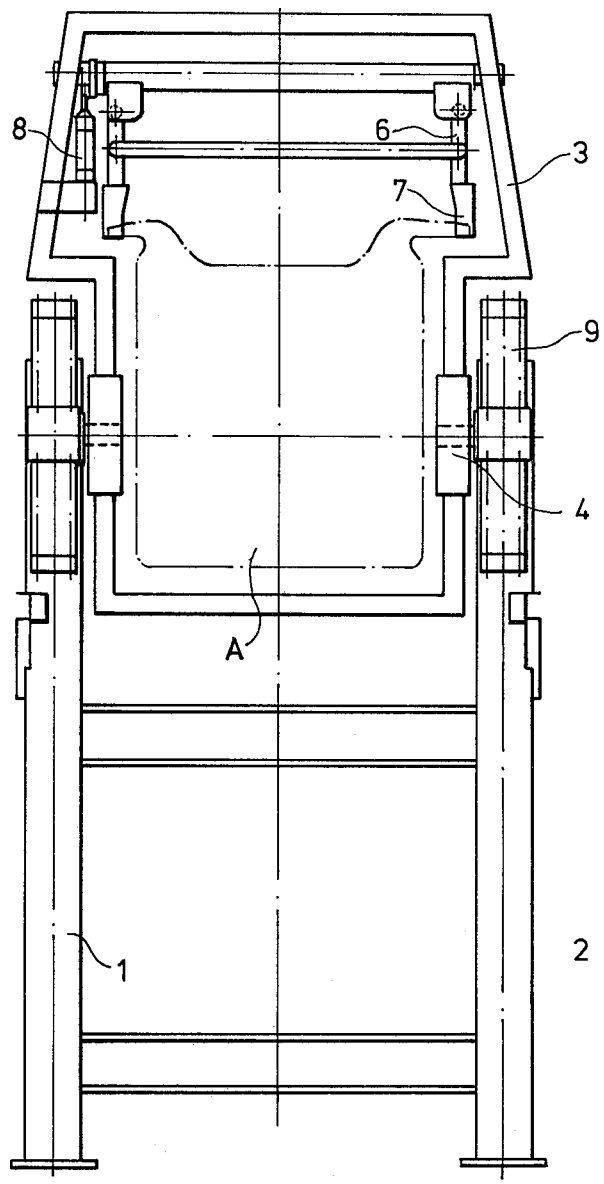
FIG. 2 shows a front view of the same device.

Supported by pillars 1, 2 and pivoted to a horizontal shaft 4 there is a lifting frame 3 which has, for example, been welded together from metal profiles and in its highest position (FIG. 2) surrounds the lifted anode plate A. Close to one side of the lifting frame 3 there is a straight horizontal shaft 5 to which arms 6 have been articulated. At the free ends of the articulated arms 6 there are gripping members 7, and the arms can be moved reciprocally by means of a hydraulic cylinder 8 to grip and release the lugs of the anode plate A. There can be a suitable counterbalance at the other end of the frame.

The transfer of the anode plate A from the casting table 12 into the cooling tank takes place as follows.

Figure 1:
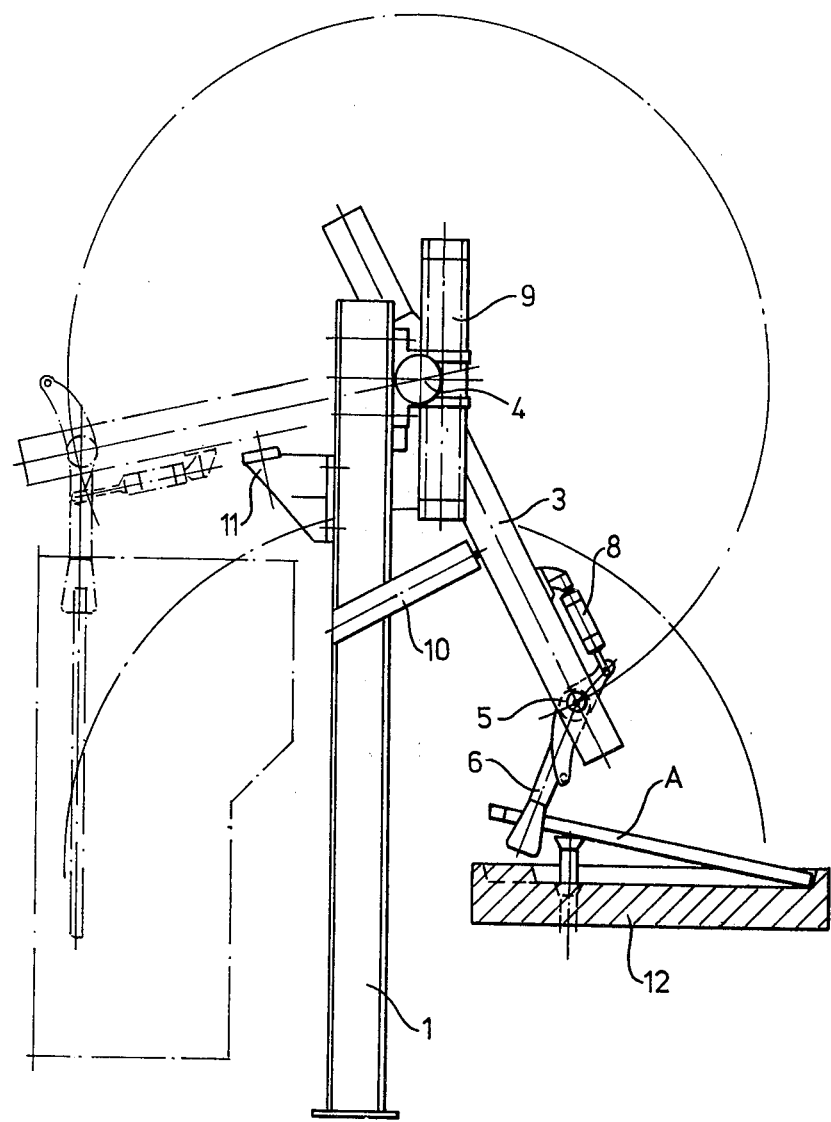
FIG. 1 shows a side view of a transferring device for anode plates according to the invention.

At the stage illustrated by FIG. 1, the controllable stud in the casting table 12 has lifted the anode plate so much that its end which has been provided with lugs is off the casting table. The lifting frame 3 is turned down (to the position shown) until it hits the stop 10, which has been adjusted so that the grippers 7 at the ends of the arms 6 come under the lugs of the anode plate. The arms 6 are pulled upwards by means of a cylinder 8, whereby the grippers 7 grip the lugs of the plate.

Thereafter the lifting frame is raised, supported by the shaft pins 4, by means of a power mechanism 9, which is not shown in detail but can be, for example, hydraulic. During the turning of the frame the anode plate is suspended, supported by the lugs, in a substantially vertical position, and when the lifting frame passes its highest position, the anode plate glides through the frame.

On the opposite side of the transfer mechanism in relation to the casting table 12 there is a cooling tank (not shown in detail), into which the lifting frame places the suspended anode plate, for example so that the lugs of the plate come to rest on horizontal supports. Even this extreme position is determined by an adjustable stop 11.

Thereafter the grippers 7 are detached by moving the anode forwards or by moving the arms by means of the cylinders 8, whereafter the lifting frame can be returned to lift the next anode plate.

As was noted above, it is clear that the mechanism of the described type can also be used for transferring anode plates or the like between other treatment states, as well as for transferring other plates, on the condition that gripping members suitable for the purpose are provided.

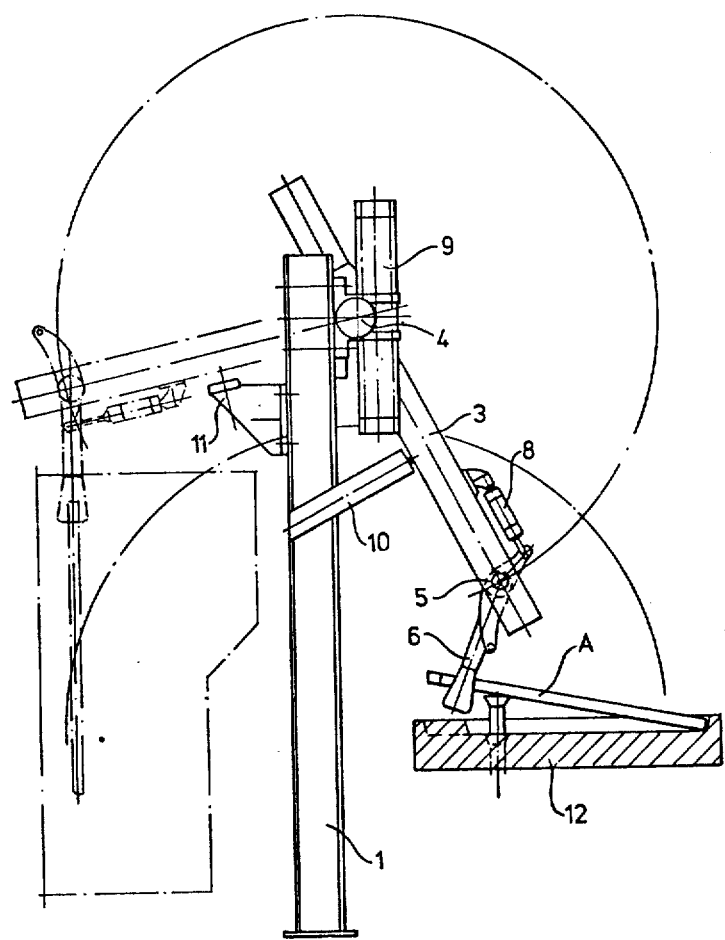

What is claimed is:

1. A device for transferring an anode plate from a casting table into a cooling tank, which comprises a base consisting of two spaced vertical pillars;

a metal lifting frame larger than said anode plate, said lifting frame being pivoted to swing about a pair of essentially horizontal pins supported by said pillars for swinging the anode plate through the frame; reciprocally movable grippers for gripping, holding and releasing lugs of the anode plate, said grippers being articulated on a shaft mounted parallel to two sides of said frame; said grippers being mounted to hold said anode plate, after gripping engagement, in a substantially vertical position after lifting the plate from the casting table and to release the plate into a cooling tank; and a power mechanism connected to said frame for turning the frame between two positions so that in one position of the frame the grippers can grip the plate lugs at said casting table and in another position of the frame the grippers can place the plate in the cooling tank.

2. A device according to claim 1, wherein said power mechanism is hydraulically operated.

* * * * *

UNITED STATES PATENT OFFICE
CERTIFICATE OF CORRECTION

Patent No. 3,938,672　　　　　　　　Dated February 17, 1976

Inventor(s)　Matti Olavi Leiponen et al.　　Page 1 of 2

It is certified that error appears in the above-identified patent and that said Letters Patent are hereby corrected as shown below:

On the cover page the drawing should appear as shown on the attached sheet.

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*